INVENTOR.
RONALD J. BODDY

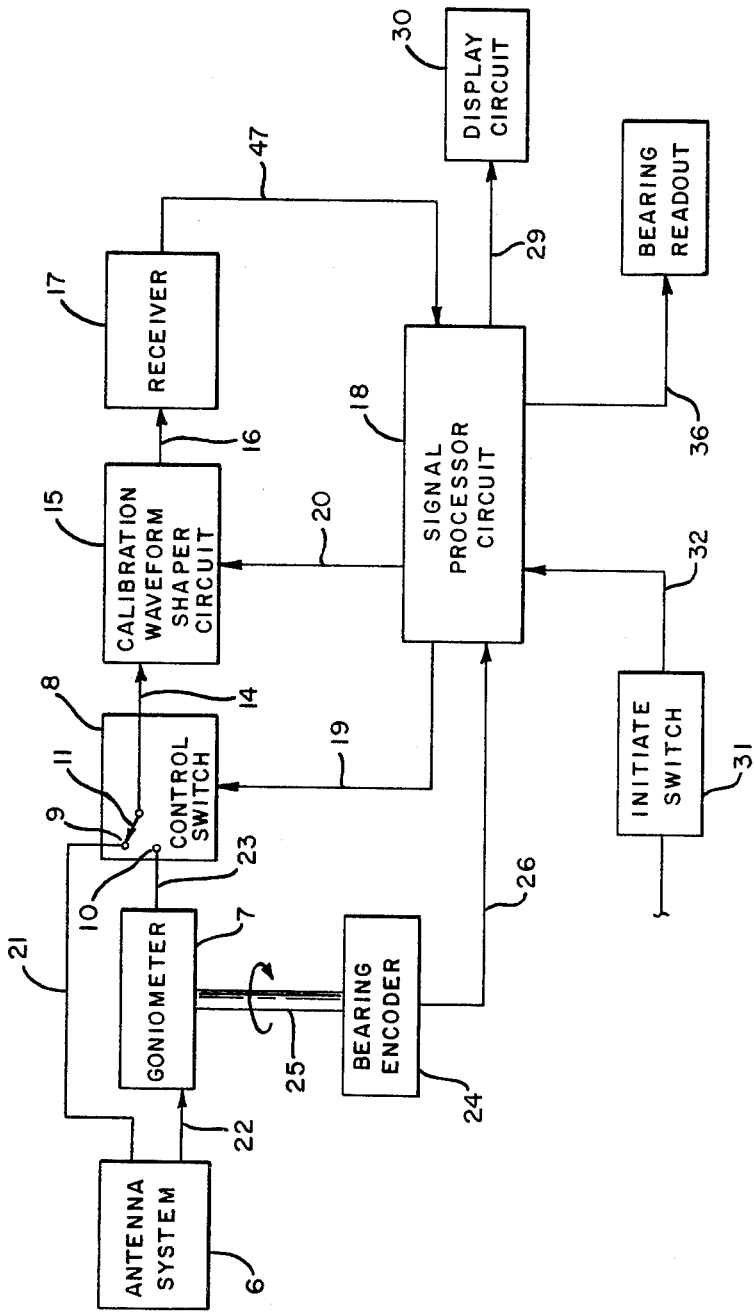

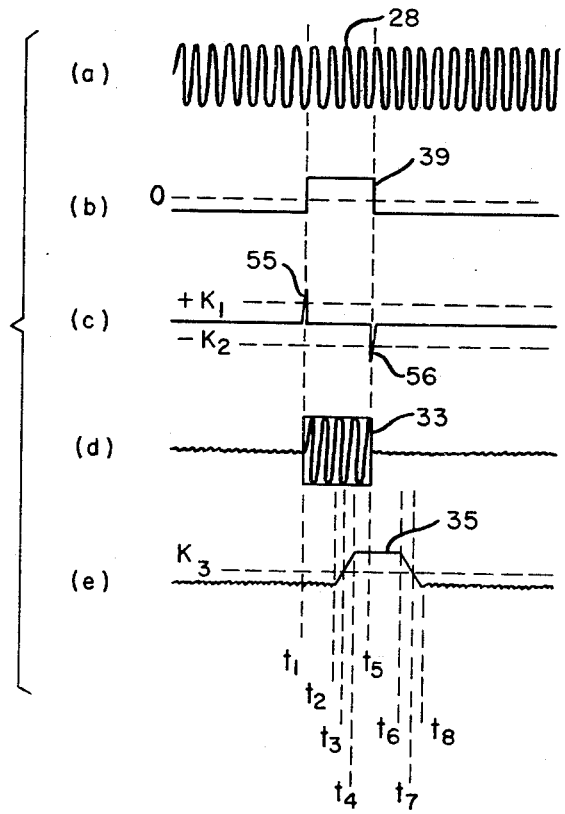
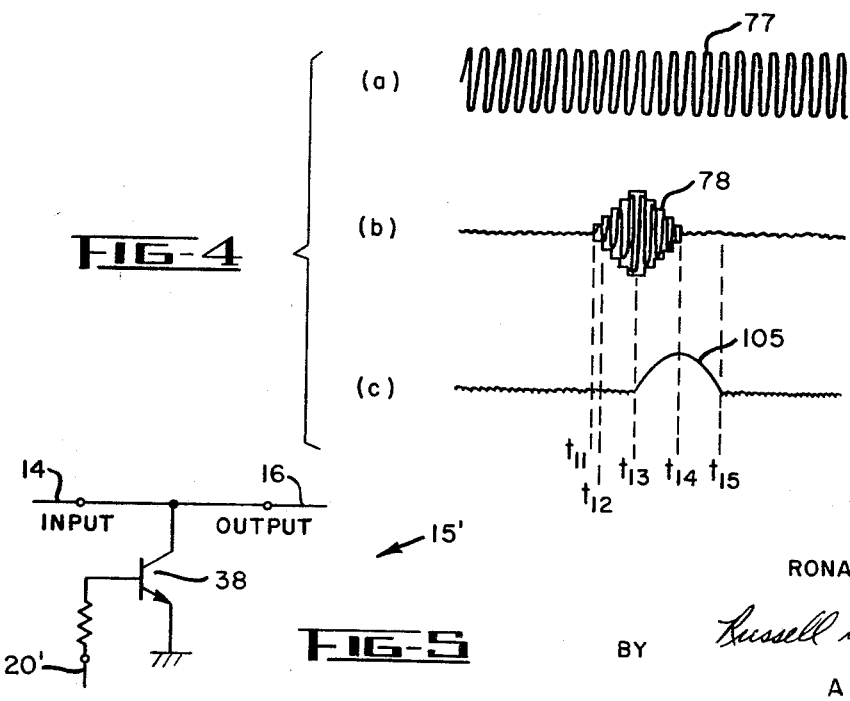

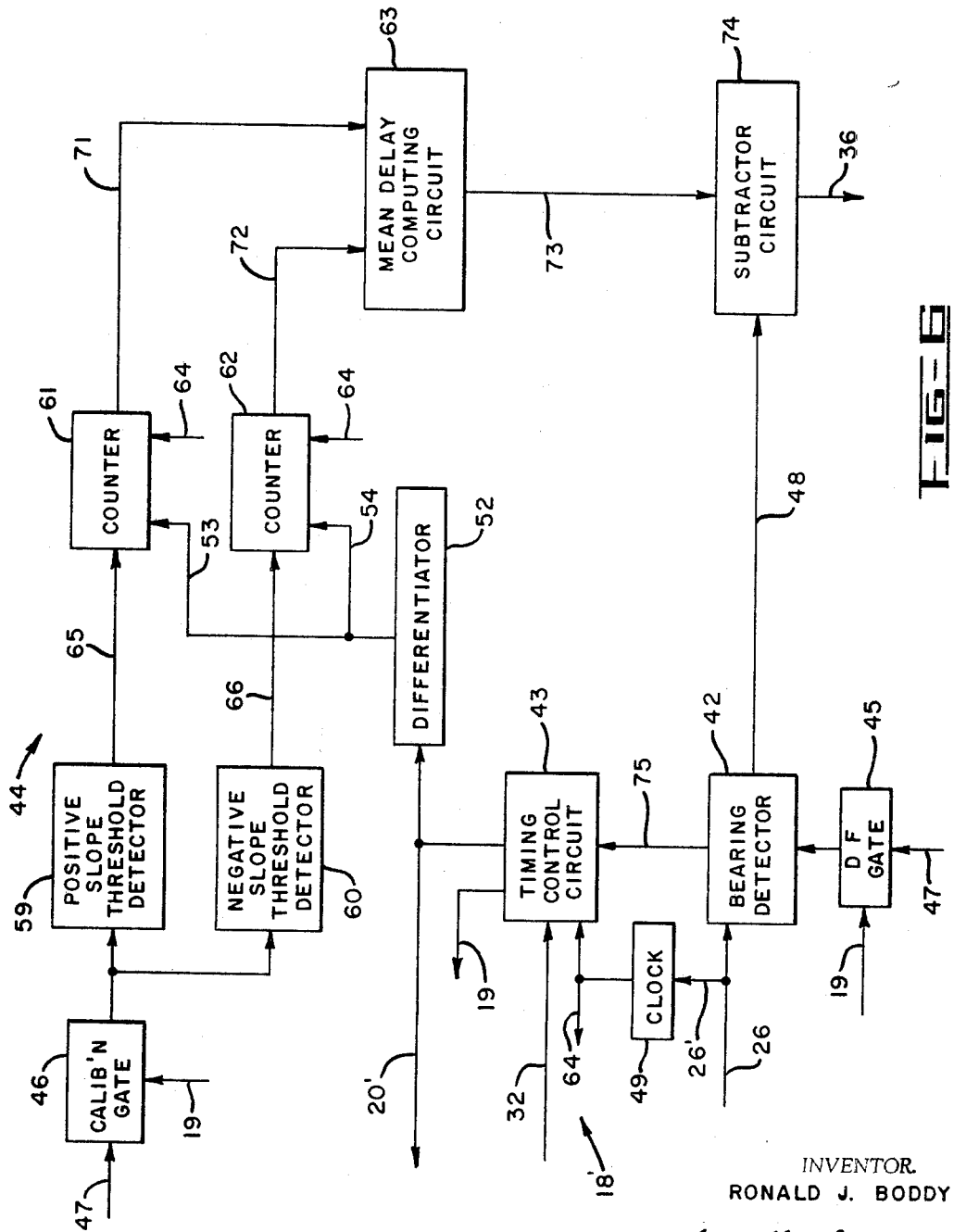

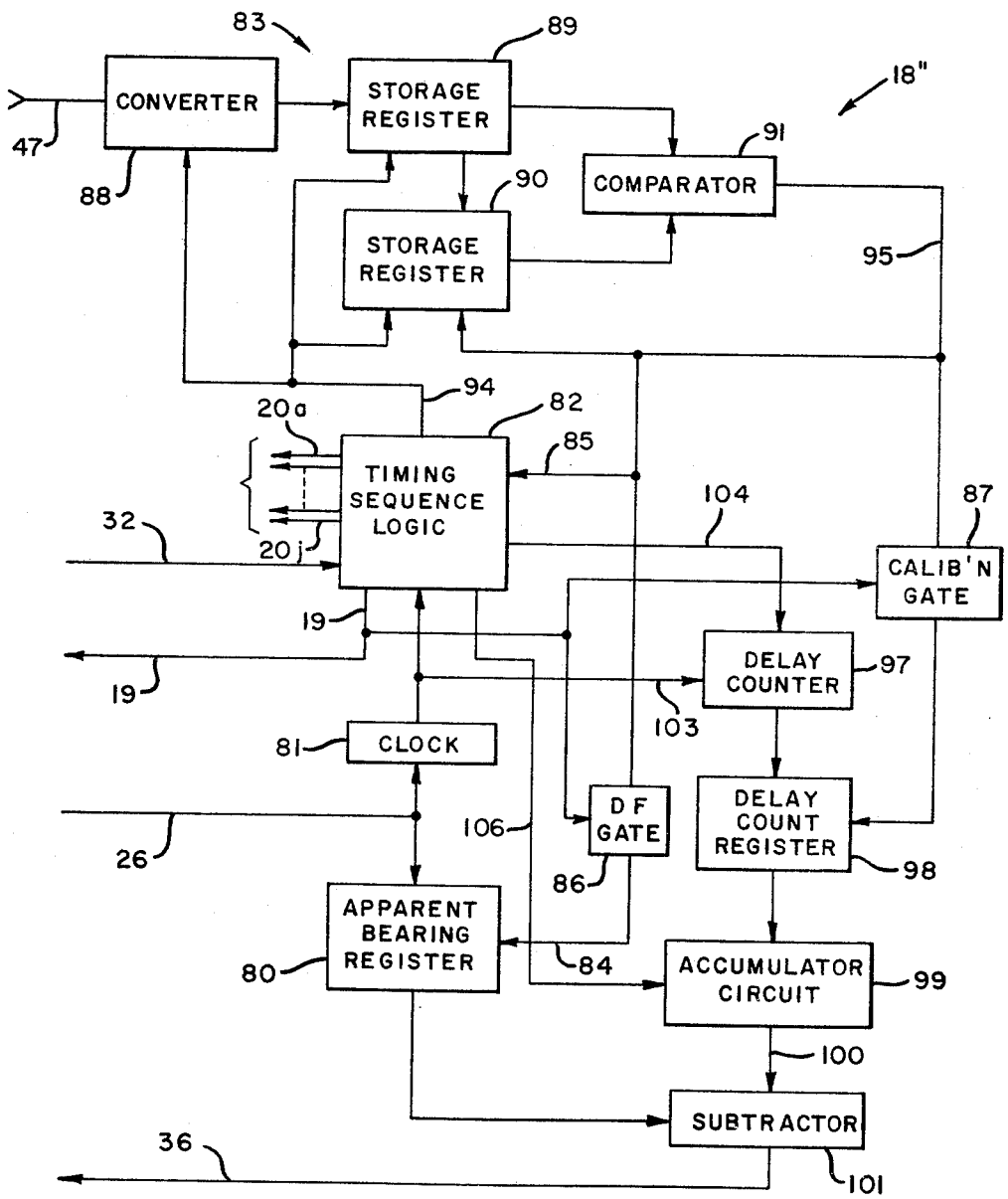

United States Patent Office 3,509,569
Patented Apr. 28, 1970

3,509,569
DIRECTION FINDING SYSTEM
Ronald J. Boddy, Monte Sereno, Calif., assignor to Sylvania Electric Products Inc., a corporation of Delaware
Filed July 1, 1968, Ser. No. 741,744
Int. Cl. G01s 3/54
U.S. Cl. 343—113                                8 Claims

ABSTRACT OF THE DISCLOSURE

A DF system producing a rotating directional beam for receiving electromagnetic signals is operable in a DF mode and a calibration mode. In the DF mode, a receiver converts received signals to IF signals which are coupled to a processor. An indication of the beam bearing is also coupled to the processor. When a received signal is detected, an indication of the beam bearing corresponding to alignment of the beam and the emitter of the received signal is stored and the system is caused to operate in the calibration mode. The received signal is then shaped in time synchronism with rotation of the beam into a calibration wave which has substantially the same Fourier spectral components as the received signal and is applied to the receiver. The relative time of occurrence of the calibration wave in the receiver output is measured by the processor and is indicative of the receiver envelope delay. This delay is subtracted from the stored beam bearing to give a corrected indication of the emitter bearing.

BACKGROUND OF THE INVENTION

This invention relates to direction finding (DF) systems and more particularly to a system for automatically determining the envelope delay of the receiver in a DF system.

Direction finding systems are employed to determine the angle or direction of arrival of a received electromagnetic signal and thus the bearing of the emitter or signal source. A typical high frequency DF system comprises a circular array of antenna elements and an associated goniometer, a receiver for determining the operating frequency band of the system, and a circuit responsive to both the receiver output and the goniometer bearing for indicating the direction of arrival of a received signal. In order to accurately indicate the emitter bearing, the receiver envelope delay characteristics must be known precisely. Conventional DF systems use sophisticated and expensive receivers employing matched linear phase filters. The envelope delay of the receiver is periodically calibrated using a test generator as a signal source. A fixed envelope delay is then preset into the system and subtracted from the goniometer bearing to obtain a corrected indication of the emitter bearing. It is expected that the receiver envelope delay will remain fixed for a prescribed period of time. It has been found that the actual envelope delay of a receiver is a function of the type of modulation on the received signal and the accuracy with which the receiver is tuned to the emitter frequency.

The receiver envelope delay is also a function of the IF filter charactristics at the frequency to which the receiver is tuned. By way of example, the waveform 1 of FIGURE 1a illustrates the filter passband associated with a commonly used HF receiver. The waveform 2 of FIGURE 1b is a plot of the envelope delay of this receiver as a function of IF frequency. It will be noted that there may be a considerable change in the receiver envelope delay for a small change in IF frequency, e.g., between 200 and 400 Hz.p.s.

An object of this invention is the provision of a system which utilizes the received signal as the source signal during measurement of the receiver envelope delay.

Another object is the provision of a system which calibrates the receiver envelope delay under the same conditions as when the receiver is used to perform its function in the DF measurement.

SUMMARY OF THE INVENTION

In accordance with this invention, when an operator desires a bearing indication of an emitter, the receiver envelope delay is measured using the signal from the emitter as the calibration signal. A shaping circuit operates on the signal received by the DF antennas to shape it into a calibration wave having similar Fourier spectral components to the actual DF output of the goniometer. This calibration wave is applied to the receiver. A measuring circuit determines the event timing of the calibration wave in the receiver output which is the time difference between time of generation of the calibration wave and its passage by the receiver. This time difference is a measure of the receiver envelope delay which is subtracted from the goniometer bearing to obtain a corrected bearing indication of the emitter.

BRIEF DESCRIPTION OF THE DRAWINGS

FIGURE 2 is a block diagram of a DF system embodying this invention;

FIGURES 3 and 4 are waveforms illustrating the operation of the system of FIGURE 2;

FIGURE 5 is a circuit diagram of the calibration waveform shaper circuit of FIGURE 2;

FIGURE 6 is a block diagram of the signal processor of FIGURE 2;

FIGURE 8 is a block diagram of an alternate embodiment of the signal processor of FIGURE 2.

DESCRIPTION OF PREFERRED EMBODIMENT

Figure 1A:
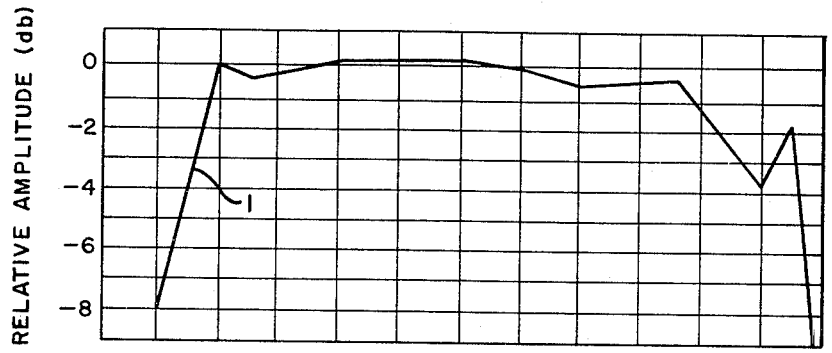
FIGURE 1a is a curve illustrating the response of a passband filter in the receiver of a heigh frequency DF system.

Referring now to FIGURE 2, the DF system comprises antenna system 6, goniometer 7 and control switch 8. The output of the control switch on line 14 is coupled through calibration waveform shaper circuit 15 and receiver 17 to signal processor circuit 18. The output of the processor on line 19 controls the operation of switch 8. Bias signals from the processor on line 20 control the operation of the calibration waveform shaper circuit.

The antenna system 6 may, by way of example, be a Wullenweber array comprising a circular array of monopole antennas and a plurality of multicouplers (not shown) which are selectively interconnected such that the system operates as an omni-directional antenna or produces a plurality of directional beams. When the system operates in the calibration mode to measure the receiver envelope delay, the antenna system operates as an omni-directional antenna or uses one of the directional beams, and received signals are coupled on line 21 to the first terminal 9 of the control switch.

Goniometer 7 comprises a plurality of rotating elements with mutual coupling to static elements (not shown). When the system operates in the DF mode to locate the position of an emitter, the rotating elements couple to the multicouplers and monopole antennas through line 22 to produce a rotating DF beam. The output of the goniometer is coupled on line 23 to the second terminal 10 of the control switch. Bearing encoder 24 is mechanically coupled to the goniometer through rotating shaft 25 for producing a precise indication on line 26 of the goniometer bearing and thus of the orientation of the bore-sight axis of the DF beam.

During operation in the DF mode, the arm 11 of the control switch is connected to terminal 10. For illustrative purposes, consider that the continuous wave (CW) signal 28 of FIGURE 3a is received by the antenna system. The output of the goniometer is converted to an IF signal by the receiver. The IF signal is detected by the processor which records an indication of the goniometer bearing corresponding to alignment of the beam and emitter and which produces an output on line 29 that causes display circuit 30 to indicate that a signal has been received. The operator then actuates initiate switch 31 to cause the system to operate in the calibration mode and the processor to produce a control signal on line 19. Alternatively, the processor automatically produces the control signal on line 19 when an incident signal is detected to cause switch 8 to connect the output of the antenna system on line 21 through terminal 9 and arm 11 to the shaper circuit as shown. Actuation of switch 31 also causes the processor to produce a bias signal on line 20 which biases circuit 15 to shape the received signal into the calibration wave or pulse 33, see FIGURE 3d. The calibration wave is applied to the receiver which produces the video output 35, see FIGURE 3e, that is coupled to processor 18. The signal processor determines the event timing of the wave 35 passed by the receiver. The event timing is the difference in time between generation of the calibration wave 33 and passage of wave 35 by the receiver. This time difference is a measure of the receiver envelope delay and is subtracted from the goniometer bearing indication on line 26 by the processor to produce on line 36 a corrected indication of the emitter bearing.

Referring now to FIGURE 5, the calibration waveform shaper circuit 15' for producing the calibration wave 33 of FIGURE 3d comprises a single transistor switch 38. During operation in the DF mode, switch 38 is cut off by a positive bias voltage from the processor on line 20' so that signals coupled to the shaper circuit are unaltered. When the system operates in the calibration mode, however, the negative bias voltage 39, see FIGURE 3b, is applied on line 20' prior to time $t_1$ and after time $t_5$ to to saturate the transistor and shunt the received signal to ground. Between times $t_1$ and $t_5$, the positive voltage 39 biases transistor 38 into cutoff to present an open circuit between lines 14 and ground, and thus to shape the received signal 28 into the calibration signal 33.

The signal processor 18' associated with shaper circuit 15' is shown in detail in FIGURE 6 and comprises bearing detector 42, timing control circuit 43, measuring circuit 44 and gate circuits 45 and 46. DF mode gate 45 is responsive to the bias voltage on line 19 for coupling the receiver output on lines 47 to detector 42 during operation in the DF mode. The bearing detector is responsive to the output of the bearing encoder for producing on line 48 an electrical signal that is an indication of the apparent bearing of the emitter. The output of the bearing encoder is also applied on line 26' to clock circuit 49 which produces clock pulses having a pulse repetition frequency synchronized with the rate of rotation of the goniometer. In a digital system, the clock rate may be synchronized with or derived from the least significant bit in the indication of the goniometer bearing. The operation of timing circuit 43 is synchronized with the clock pulses.

Timing circuit 43 produces the control signal on lines 19 that causes switch 8 to connect the output of the antenna system on lines 21 to shaper circuit 15'. The timing circuit also produces the bias voltage 39 on line 20' which causes the shaper circuit to shape the received signal into the square wave calibration signal 33. The bias voltage 39 is also applied to differentiator circuit 52 which produces on lines 53 and 54 the output signal illustrated in FIGURE 4c. The positive pulse 55 on line 53 corresponds to the time of generation of the leading edge of calibration pulse 33 at time $t_1$. The negative pulse 56 on line 53 corresponds to the time of generation of the trailing edge of the calibration pulse at time $t_5$.

Measuring circuit 44 comprises positive and negative slope threshold detector circuits 59 and 60, respectively, counters 61 and 62, and mean delay computing circuit 63. The counters are responsive to clock pulses on line 64 which synchronize the operation of the counters with rotation of the goniometer. The pulses 55 and 56 in the differentiator output control initiation of operation of counters 61 and 62, respectively.

Calibration gate 46 is responsive to the bias voltage on line 19 for connecting the receiver output on line 47 to detectors 59 and 60 during operation in the calibration mode. Detector 59 is responsive to the output of receiver 16 having a positive slope and traversing a positive threshold level $k_3$, see FIGURE 3e, time $t_3$, for producing a control signal on line 65. Detector 60 also has a positive threshold level $k_3$ which must be traversed by an output of receiver 16 having a negative slope for the detector to change operating states and produce a control signal on line 66. Counters 61 and 62 are responsive to the signals on lines 65 and 66, respectively, for terminating the count thereof. Since the counters are counting clock pulses on line 64 which are synchronized with rotation of the goniometer, the counts in the counters are proportional to angle of rotation of the beam.

Computing circuit 63 averages the count stored in counters 61 and 62 to provide an indication on line 73 of the mean delay of the receiver. Subtractor circuit 74 is responsive to the signals on lines 48 and 73 for providing on line 36 an indication of the corrected bearing of the emitter.

The system operates in the DF mode, with arm 11 of switch 8 connected to terminal 10, until a signal is received on which a bearing is required. Bearing detector 42 then produces an output on lines 75 which biases the timing circuit to cause the system to operate in the calibration mode. Alternatively, the system operates in a fixed beam or monitor mode until a signal is received upon which a DF operation is required. In either case, after the operator actuates initiate switch 31, the receiver envelope delay is automatically measured by the system which produces a corrected indication of the emitter bearing. Actuation of switch 31 causes the timing circuit to produce a control signal on line 19 which causes switch 8 to connect the received signal 28 from the antenna system on line 21 to the shaper circuit as shown in FIGURE 2. The bias signal 39 on line 20' controls conduction of transistor 38 to produce the calibration pulse 33 between time $t_1$ and time $t_5$. The calibration pulse 33 is applied to the receiver at time $t_1$. The pulse 55 from differentiator 52 biases counter 61 to start counting when the calibration pulse 33 is generated at time $t_1$.

When the leading edge of the calibration pulse is passed by the receiver and exceeds the threshold level $k_3$ at time $t_3$, see FIGURE 3e, detector 59 changes operating states and biases counter 61 to stop counting. The count stored by counter 61 is related to the envelope delay of the receiver. Since the leading edge delay and trailing edge delay of the output of the receiver may be different under certain conditions such as nonidentical phase versus frequency characteristics of the IF filter and because of the effect of modulation upon the received signal on line 21 it is necessary to also determine the event timing of the trailing edge of the pulse.

When calibration pulse 33 is terminated at time $t_5$, the pulse 56 from differentiator 52 causes counter 62 to start counting. When the trailing edge of the video output 35 of the receiver falls below the threshold $k_3$ at time $t_7$, see FIGURE 3e, detector 60 changes operating states to bias counter 62 to stop counting. The count stored by this counter is proportional to the trailing edge time delay of the receiver i.e., is proportional to the time difference between the termination of the calibration pulse 33 and the termination of pulse 35. The contents of counters 61 and 62 are summed by computing circuit 63 and divided by two to produce an indication of the mean envelope delay of the receiver. Circuit 74 subtracts the indication of the mean delay of the receiver on line 73 from the apparent bearing indication of the emitter on line 45 to produce the corrected bearing indication on line 36.

Figure 7:
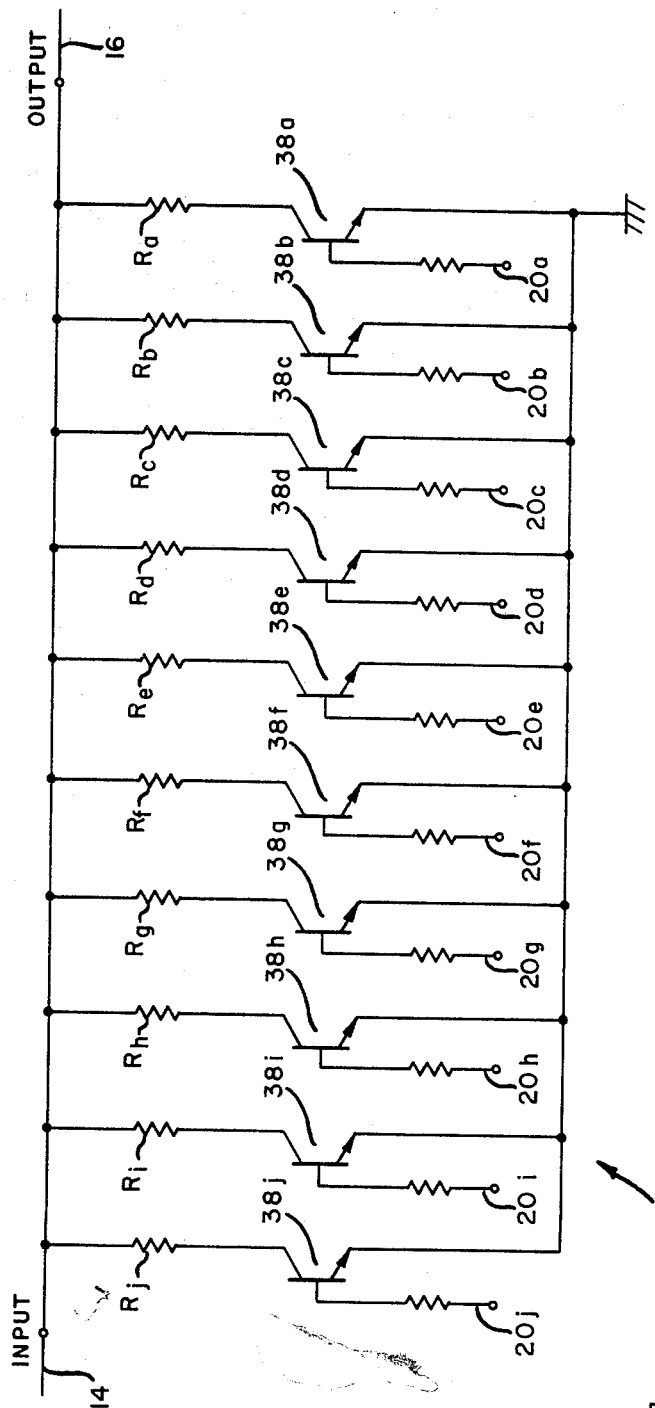
FIGURE 7 is a block diagram of an alternate embodiment of the calibration waveform shaper circuit of FIGURE 2.

In a modified form of this invention a received signal 77 is shaped to produce the calibration wave 78, see FIGURES 4a and 4b, respectively, having nearly the same Fourier spectral components as the actual DF output of the goniometer. The shaper circuit 15″ for producing the calibration wave 78 is illustrated in detail in FIGURE 7. This wave shaper is similar to circuit 15′ in structure and operation and comprises a plurality of make-before-break transistor switches 38a through 38j. Each transistor switch has an associated load resistor $R_a$–$R_j$, respectively, in the collector circuit thereof. In an actual embodiment of this invention which was actually built and tested, the resistors $R_a$ through $R_j$ had the resistances of 0, 3, 22, 51, 100, 160, 270, 510, 820 and 2.4K ohms, respectively. Conduction of each switch 38 is controlled by a different bias voltage applied on an associated control line 20a–20j.

The signal processor circuit 18″ associated with the shaper circuit 15″ is illustrated in detail in FIGURE 8 and comprises apparent bearing register 80, clock circuit 81, timing sequence logic circuit 82 and peak detection circuit 83. The apparent bearing register 80 is responsive to a control signal on line 84 for storing the goniometer bearing indication on line 26. Clock 81 is responsive to the goniometer bearing indication on line 26 for synchronizing the clock pulses with rotation of the goniometer.

Timing circuit 82 is responsive to clock pulses from clock 81 for synchronizing the generation of timing signals with rotation of the goniometer. The timing circuit also produces a sequence of bias voltages on lines 20a–20j which control the operation of shaper circuit 15″. Timing circuit 82 also produces the signal on line 19 which controls operation of switch 8. The output of the timing circuit on line 19 also controls the operation of DF mode gate 86 and calibration mode gate 87.

Detection circuit 83 comprises analog-to-digital converter 88 which is responsive to the output of receiver 17, first and second storage registers 89 and 90, and comparator 91. The A–D converter is responsive to signals on line 94 from the timing circuit for sampling the output of the receiver at a prescribed rate. Registers 89 and 90 and comparator 91 are also responsive to timing signals from circuit 82 for synchronizing operation of these circuits and the converter with rotation of the goniometer. Storage register 89 stores the current sample produced by the converter. The contents of register 89 is coupled to storage register 90 and comparator 91. If the contents of register 89 is greater than the contents of register 90, the comparator produces a pulse on line 95 which causes register 90 to receive the contents of register 89. The output of the comparator is also the signal on line 84 which controls the operation of bearing register 80. The comparator output is applied on line 85 to the timing circuit to cause the system to automatically operate in the calibration mode when an incident signal is detected.

The peak detection circuit also comprises delay counter 97, delay counter register 98, accumulator circuit 99 and subtractor circuit 101. Counter 97 is responsive to clock pulses on line 103 for counting at a prescribed rate proportional to the goniometer bearing. The delay counter is reset by the output of the timing circuit on line 104 at time $t_{12}=n/2$, where $n$ is the number of incremental steps employed in shaping the calibration wave 78 and corresponds to $j=10$ incremental steps in the embodiment of the invention illustrated in FIGURE 7. Register 98 is responsive to the output of the comparator on line 95 for storing the count in counter 97.

When the system is operating in the DF mode the output of the timing circuit on line 19 biases switch 8 to connect arm 11 to terminal 10 and thus connect the output of the goniometer to the receiver. The signal on line 19 also opens gate 87 and closes gate 86 to connect the output of the comparator to the apparent bearing register 80. Converter 88 is responsive to the control signals from the timing circuit for sequentially sampling the DF signal passed by the receiver to provide output signals which are sequentially stored by storage register 89. If the contents of register 89 is greater than the contents of register 90, the comparator produces a pulse on line 95 which causes register 90 to store the contents of register 89. Each pulse on line 95 enables register 80 which samples and stores the value of the digitally encoded goniometer bearing contained on line 26. During the sample of the receiver output immediately following alignment of the bore sight axis of the DF beam with the emitter, the signal stored by register 89 is no longer greater than that stored by register 90. The immediately preceding output of comparator 91 therefore corresponded to the pointing direction of the beam. It is an indication of this pointing direction that is already stored in register 80. When it is determined that an accurate indication of the emitter bearing is required, the operator actuates switch 31 and the system automatically calibrates the receiver and produces an indication of the corrected bearing of the emitter.

Actuation of switch 31 causes timing circuit 82 to produce an output on line 19 which causes switch 8 to connect the output of the antenna system on line 47 to the shaper circuit 15″ as shown in FIGURE 2, to close the DF mode gate 86 and to open the calibration mode gate 87. The bias signals on line 20 initially cause all of the transistors 38a–38j to conduct prior to time $t_{11}$ to shunt the received signal to ground and effectively block it from the receiver as shown in FIGURE 4b. At time $t_{11}$, the bias signal on line 20a biases transistor 38a into cutoff and causes the amplitude of the signal passed by the shaper circuit on line 16 to increase, see FIGURE 4b, time $t_{11}$. At time $t_{12}$, the signal on line 20b biases transistor 38b to also be cut off to cause a further increase in the magnitude of the output of the shaper circuit on line 16. In a similar manner, the other bias-control signals on line 20 cause the other transistors 38 to sequentially be cutoff and then to sequentially conduct in a reverse order to produce the calibration wave 78 which includes substantially the same Fourier spectral components as the actual DF output of the goniometer.

When the calibration signal 78 reaches its peak magnitude at time $t_{13}$, the output of the timing circuit on line 104 causes the delay counter to be reset to zero. Peak detection circuit 83 operates as it did in the DF mode as described above to produce an output of the comparator on line 95 which biases storage register 90 to hold the contents thereof when the receiver output is at its peak amplitude. This output of the comparator is coupled through gate 87 to cause the delay count register to also hold the contents thereof which is equal to the count of the delay counter 97. The count stored by register 98 is a measure of the receiver envelope delay and is equal to the time interval between the generation of the peak of the calibration wave 78 at time $t_{13}$ and detection of the peak of the output 105 of the receiver at time $t_{14}$, see FIGURE 4c.

Since the amplitude of the calibration wave may be caused to vary by modulation on the received signal, the contents of counter 90 may be greater than that stored by counter 89 at a number of times during a calibration cycle. After a time interval that is sufficient for the calibration wave to pass its peak value, a control signal from the timing circuit on line 106 biases accumulator circuit 99 to add the contents of register 98 to that of the accumulator. After a prescribed number of calibration cycles the acccumulator divides the contents thereof by the prescribed number to provide an indication on line 100 of the mean receiver envelope delay. Circuit 101 subtracts the mean bearing delay from the apparent bearing indication stored in register 80 during operation in the DF mode to provide on line 36 an indication of the corrected bearing of the emitter.

Figure 1B:
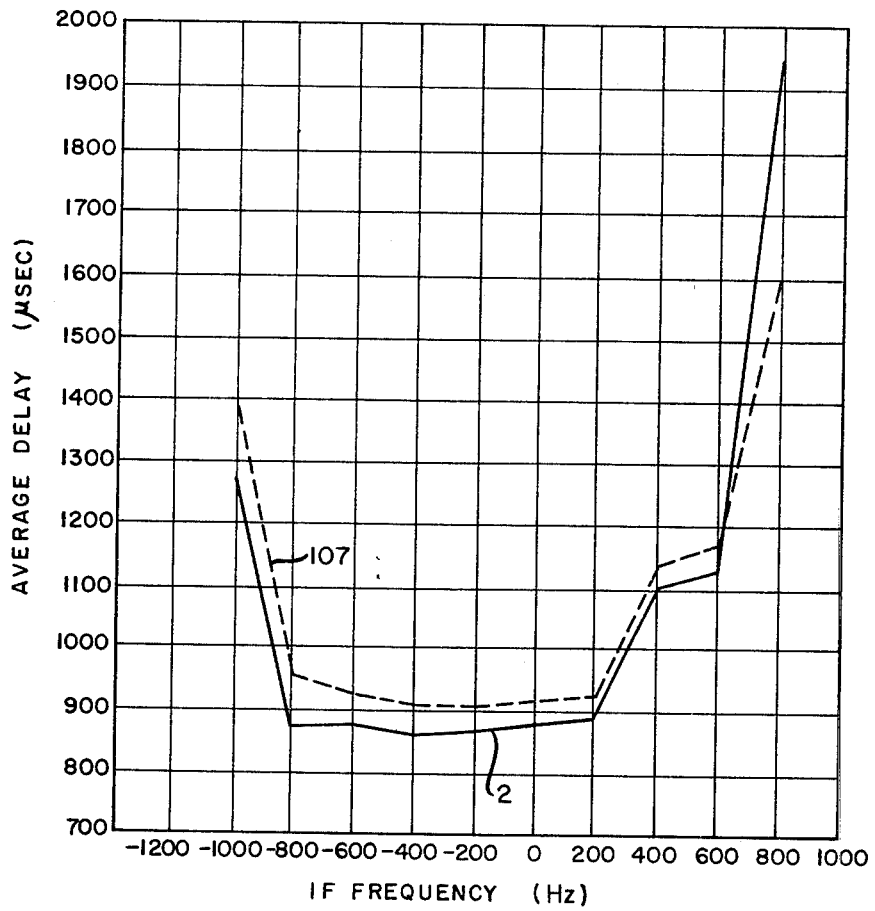
FIGURE 1b is a curve illustrating the delay of the receiver incorporating the filter of FIGURE 1a, as a function of IF frequency.

The waveform 107 in FIGURE 1b illustrates the receiver envelope delay measured by a system embodying this invention that was actually built and tested. Comparison of curves 2 and 107 reveal that the indication of the receiver envelope delay provided by this system is substantially equal to and is a good mapping of the actual envelope delay of the receiver.

What is claimed is:

1. In a DF system including circuitry generating a moving direction finding beam for receiving incident electromagnetic signals from emitters and providing an indication of the pointing direction of the beam, receiver circuitry defining the operating frequency band of the system, and detector circuitry determining alignment of the beam with an emitter of an incident signal, the method of measuring the receiver envelope delay comprising the steps of receiving an incident electromagnetic signal,
shaping the received signal to produce a calibration wave,
coupling the calibration wave to the receiver, and
determining the event timing of the calibration wave in the receiver output as a function of movement of said beam, said event timing being a measure of the receiver envelope delay.

2. In the system according to claim 1, the method of producing a corrected indication of the emitter bearing comprising the steps of determining the pointing direction of the beam corresponding to alignment of the beam with the emitter of said received signal,
producing an indication of said pointing direction, and
taking the difference between the indication of the beam pointing direction and the indication of the receiver envelope delay for producing a corrected indication of the emitter bearing.

3. The method according to claim 2 wherein the same detection circuitry is employed in determining alignment of the beam and emitter and in measuring the receiver envelope delay.

4. The system according to claim 2 wherein the steps of determining and producing an indication of the beam pointing direction which corresponds to alignment of the beam with the emitter of siad received signal that is employed to produce the calibration wave are performed in time sequence with calibration of the receiver envelope delay.

5. The method according to claim 1 wherein the calibration wave passed by the receiver comprises substantially the same spectral components as the receiver output corresponding to the emitter signal received by the moving DF beam.

6. The method according to claim 1 wherein the step of determining the event timing of the calibration wave passed by the receiver comprises the steps of sampling the receiver output at a prescribed rate,
comparing the magnitude of each current sample with the magnitude of the preceding sample, and
recording the time that the magnitude of the current sample is less than the magnitude of the preceding sample.

7. A direction finding system comprising means producing a moving direction finding beam for receiving an electromagnetic signal from an emitter, said beam moving means producing a first output signal which is the received signal and producing a second output signal indicating the bearing of the beam,
a control circuit producing a control signal having first and second values and producing timing signals,
means responsive to the first value of said control signal for passing signals received by said beam moving means and responsive to the second value of said control signal and said timing signals for shaping the received signal passed by said beam moving means into a calibration wave signal,
a receiver responsive to the output of said shaping means,
a signal processor having a first input receiving signals passed by said receiver, having a second input receiving the second output signal of said beam moving means, and having a third input receiving said timing signals, said processor producing a first output signal indicating receipt of an incident signal and a second output signal indicating the beam bearing corresponding to alignment of said beam and the emitter, said control circuit being responsive to the first output signal of said processor for causing the first output signal of said control circuit to have a second value for causing said shaping means to shape the received signal into a calibration wave,
said processor circuit being responsive to said timing signals and said receiver output for detecting the event timing of the calibration wave passed by said receiver and producing a third signal indicative of the envelope delay of said receiver, means responsive to said second and third output signals from said processor for obtaining the difference therebetween which is indicative of the corrected bearing of the emitter, and
utilization means responsive to the output of said difference means.

8. A direction finding system comprising means producing a moving direction finding beam for receiving an electromagnetic signal from an emitter, said beam moving means producing a first output signal which is the received signal and producing a second output signal indicating the bearing of the beam,
a control circuit producing a control signal having first and second values and producing timing signals synchronized with movement of said beam,
means responsive to the first value of said control signals for passing signals received by said beam moving means and responsive to the second value of said control signal and said timing signals for shaping the received signal passed by said beam moving means into a calibration wave signal,
a receiver responsive to the output of said shaping means,
means responsive to said timing signals, the received signal passed by said receiver, and the second output signal of said beam moving means for producing a first output signal indicating receipt of an incident signal and producing a second output signal indicating the beam bearing for alignment of said beam and the emitter, said control circuit being responsive to the first output signal from said beam bearing indicating means for causing the first output signal of said control circuit to have a second value to cause said shaping means to shape the received signal into a calibration wave, means responsive to said timing signals and said receiver output for producing an output signal indicative of the event timing of the calibration wave passed by said receiver, means for obtaining the difference between the second output signal of said beam bearing indicating means and the output signal of said event timing means to provide an output signal indicative of the corrected bearing of the emitter, and utilization means responsive to the output of said difference means.

References Cited

UNITED STATES PATENTS

| 3,104,391 | 9/1963 | Hansel | 343—113 |
| 3,131,393 | 4/1964 | Oppedahl | 343—114 |

RODNEY D. BENNETT, JR., Primary Examiner

R. E. BERGER, Assistant Examiner

U.S. Cl. X.R.

343—114